US012113321B1

(12) United States Patent
Sekine

(10) Patent No.: US 12,113,321 B1
(45) Date of Patent: Oct. 8, 2024

(54) TERMINAL

(71) Applicant: Napra Co., Ltd., Tokyo (JP)

(72) Inventor: Shigenobu Sekine, Tokyo (JP)

(73) Assignee: Napra Co., Ltd., Tokyo (JP)

( * ) Notice: Subject to any disclaimer, the term of this patent is extended or adjusted under 35 U.S.C. 154(b) by 0 days.

(21) Appl. No.: 18/368,200

(22) Filed: Sep. 14, 2023

(30) Foreign Application Priority Data

Apr. 10, 2023 (JP) ................................ 2023-063460

(51) Int. Cl.
*H01R 4/58* (2006.01)
*H01B 1/02* (2006.01)
*H01R 13/03* (2006.01)

(52) U.S. Cl.
CPC ............... *H01R 4/58* (2013.01); *H01B 1/026* (2013.01); *H01R 13/03* (2013.01)

(58) Field of Classification Search
CPC ........... H01R 4/58; H01R 13/03; H01B 1/026
See application file for complete search history.

(56) References Cited

U.S. PATENT DOCUMENTS 9,788,438 B2 * 10/2017 Lim ........................ C25D 3/62
2007/0037058 A1 * 2/2007 Visco .................... H01M 4/134 429/185
2007/0295528 A1 * 12/2007 Nishi ...................... C22C 13/00 174/126.4
2015/0380373 A1 * 12/2015 Moon .................... H01L 24/17 257/738

FOREIGN PATENT DOCUMENTS

JP S51-75629 A 6/1976
JP S53-32832 A 3/1978
JP 4219144 A1 * 12/1992
JP H0613434 A * 1/1994
JP 2003-082499 A 3/2003
JP 3752471 B2 * 3/2006
JP 2012-036436 A 2/2012
JP 2014-164964 A 9/2014
JP 2017-188488 A 10/2017
TW 201831725 A 9/2018

OTHER PUBLICATIONS

Office Action issued on May 15, 2024 in the corresponding Taiwanese Patent Application 112123788.

* cited by examiner

*Primary Examiner* — Jean F Duverne
(74) *Attorney, Agent, or Firm* — Carrier, Shende & Associates P.C.; Joseph P. Carrier; Fulchand P. Shende

(57) ABSTRACT

According to this invention, provided is a terminal having a plating layer formed on a surface of a base, the plating layer having a structure in which an intermetallic compound crystal that contains Sn, Cu, Cr and Ni, is dispersed in a parent phase that contains Sn and an Sn—Cu alloy.

6 Claims, 7 Drawing Sheets

MEASUREMENT CONDITIONS

| | |
|---|---|
| APPARATUS | : IT300 (LA) |
| ACCELERATION VOLTAGE | : 15. 0 kV |
| IRRADIATION CURRENT | : 7. 47500 nA |
| PHA MODE | : T3 |
| ELAPSED TIME | : 459. 44 sec |
| EFFECTIVE TIME | : 455. 06 sec |
| DEAD TIME | : 0 % |
| COUNTING RATE | : 1350 cps |
| ENERGY RANGE | : 0 - 20 keV |

SIMPLE QUANTIFICATION
ANALYSIS BY ZAF METHOD
FITTING COEFFICIENT : 0.1625

| Symbol | (keV) | MASS% | σ | NUMBER OF ATOMS % | COMPOUND | MASS% | NUMBER OF CATIONS | K |
|---|---|---|---|---|---|---|---|---|
| Cr K | 5.411 | 0.79 | 0.05 | 1.69 | | | | 0.8358 |
| Ni K | 7.471 | 0.37 | 0.07 | 0.88 | | | | 0.4344 |
| Cu K | 8.040 | 6.66 | 0.16 | 11.81 | | | | 7.5878 |
| Sn L | 3.442 | 92.18 | 0.27 | 86.01 | | | | 91.1420 |
| TOTAL | | 100.00 | | 100.00 | | | | |

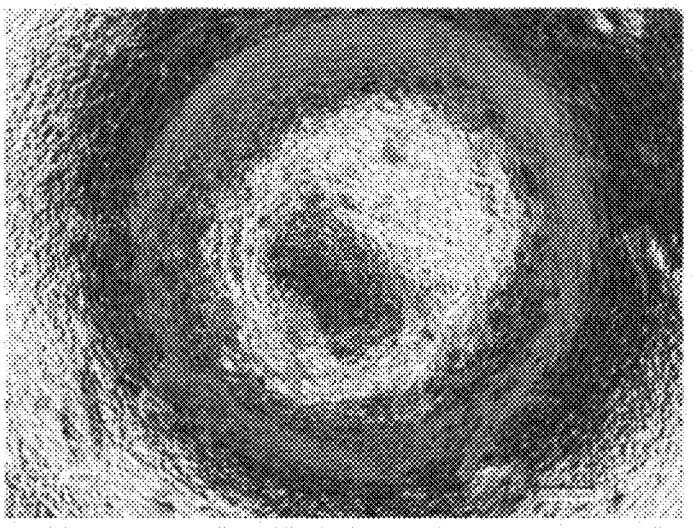
FIG. 6
FIG. 7
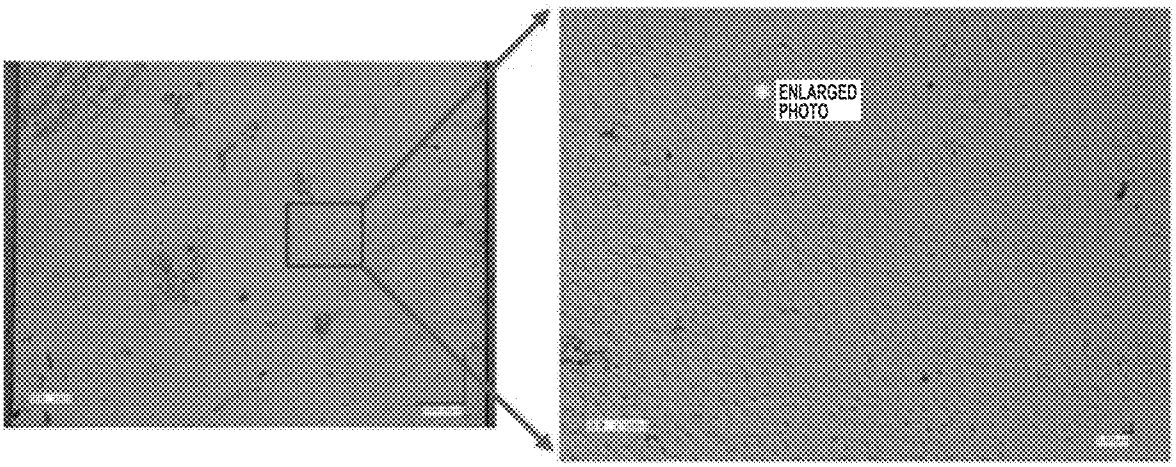

TERMINAL

INCORPORATION BY REFERENCE

This application is based on Japanese Patent Application No. 2023-063460, filed on Apr. 10, 2023, the content of which is incorporated hereinto by reference.

BACKGROUND OF THE INVENTION

1. Field of the Invention

This invention relates to a terminal and a bump, suitably applicable for example to electronic component coupling unit and junction terminal.

2. Description of the Related Art

Plating film of noble metal or monometal, such as silver plating or tin plating, has been widely used for electrical contact point and terminal in electronic equipment, such as connector, switch, and relay, for its high electric conductivity. The terminal formed of such noble metal or monometal has, however, been concerned about durability during operation under high temperature environments.

JP-A-2003-82499 discloses a tin-copper intermetallic compound-dispersed tin contact terminal, having a tin plating layer in which a tin-copper intermetallic compound disperses, formed on a surface of a base formed of copper or a copper alloy.

CITATION LIST

[Patent Document 1]

SUMMARY OF THE INVENTION

It is therefore an object of this invention to provide a terminal which excels in durability during operation under high temperature environments.

This invention is to provide a terminal having a plating layer formed on a surface of a base, the plating layer having a structure in which an intermetallic compound crystal that contains Sn, Cu, Cr and Ni, is dispersed in a parent phase that contains Sn and an Sn—Cu alloy.

Advantageous Effects of Invention

This invention can provide a terminal that excels in durability during operation under high temperature environments.

BRIEF DESCRIPTION OF THE DRAWINGS

FIG. 6 is a microphotograph illustrating a result of a surface crack test of the contact terminal obtained in Example 1.

FIG. 7 contains microphotographs illustrating a result of a heat resistance test of the contact terminal obtained in Example 1.

DESCRIPTION OF THE EMBODIMENTS

This invention will further be detailed below.

Terminology in this patent specification will be defined as follows, unless otherwise specifically noted.

(1) The term "metal" is used not only to encompass metal element as a simple substance, but also occasionally to encompass alloy and intermetallic compound composed of two or more metal elements.

(2) When referring to a certain metal element as a simple substance, it means not only an absolutely pure substance solely composed of such metal element, but also a substance containing a trace amount of other substance. That is, the metal element of course does not mean to exclude a case where a trace impurity that hardly affects properties of that metal element is contained. The parent phase for example does not mean to exclude a case where a part of atoms in Sn crystal is replaced by other element (Cu, for example). For example, such other substance or other element may occasionally account for 0 to 0.1% by mass of the electrode described later.

(3) Endotaxial joint means that an intermetallic compound precipitates in a substance which is expected to become metal or alloy (the parent phase in this invention), wherein the Sn—Cu alloy and the intermetallic compound join during the precipitation while attaining lattice matching, thereby producing crystal grains. The term "endotaxial" is a known term, which is found for example in the last paragraph on the left column on page 160, in Nature Chemistry, 3(2): 160-6, 2011.

The terminal of this invention has a structure in which a plating layer is formed on a surface of a base, wherein the plating layer has a structure in which an intermetallic compound crystal that contains Sn, Cu, Cr and Ni, is dispersed in a parent phase that contains Sn and an Sn—Cu alloy.

A plating bath for producing the plating layer will have applied thereto an electroplating electrode described below. The electroplating electrode will occasionally be referred to as an "electroplating electrode of this invention", hereinafter.

The electroplating electrode of this invention has a structure in which an intermetallic compound crystal that contains Sn, Cu, Cr and Ni, is dispersed in a parent phase that contains Sn and an Sn—Cu alloy, wherein the structure has a chemical composition represented by:

0.7 to 15% by mass of Cu;

0.001 to 1% by mass of Cr;

0.01 to 5% by mass of Ni; and the balance of Sn (possibly contains 0.1% by mass or less of an inevitable impurity), and the parent phase has a chemical composition represented by 5% by mass or less of Cu, 1% by mass or less of Ni, 1% by mass or less of Cr, and the balance of Sn (possibly contains 0.1% by mass or less of an inevitable impurity).

The intermetallic compound crystal resides in the parent phase so as to be included therein.

Figure 1:
FIG. 1 is an optical image of a cross section of an electroplating electrode of this invention obtained in Example 1, after thinned with focused ion beam (FIB).

FIG. 1 is an optical image of a cross section of an electroplating electrode of this invention obtained in Example 1, after thinned with focused ion beam (FIB).

The electroplating electrode of this invention may be a soluble electrode, and may be manufactured by a method below.

First, a metal particle described below (occasionally referred to as a "metal particle of this invention", hereinafter) is manufactured.

Next, the thus obtained metal particle of this invention is melted in vacuo under high-frequency induction heating, cast into a mold in a nitrogen gas atmosphere under the atmospheric pressure, cooled to solidify, rolled into a sheet, and multiply stacked as necessary (the resultant stack is occasionally referred to as a "bulk", hereinafter).

The metal particle of this invention may be produced typically from a raw material having a chemical composition represented by 8% by mass of Cu, 1% by mass of Cr, 1% by mass of Ni, and the balance of Sn. The metal particle is obtainable typically by melting the raw material, feeding the molten metal onto a dish-like disk which is kept under spinning at high speed in a nitrogen atmosphere, so as to centrifugally scatter the molten metal in the form of fine droplets, and by cooling and solidifying the droplets under reduced pressure.

A preferred example of a manufacturing apparatus suitable for manufacture of the metal particle of this invention will be explained referring to FIG. 4. A granulation chamber 1 has a cylindrical top and a conical bottom, and has a lid 2 placed on the top. The lid 2 has a nozzle 3 perpendicularly inserted at the center thereof, and right under the nozzle 3 arranged is a dish-like rotating disk 4. Reference sign 5 represents a mechanism that supports the dish-like rotating disk 4 so as to be movable up and down. At the lower end of the conical bottom of the granulation chamber 1, connected is a discharge pipe 6 through which the produced particles are output. An upper end of the nozzle 3 is connected to an electric furnace (high frequency induction furnace: employed in this invention is a carbon crucible, in place of a ceramic crucible having formerly been used) 7 in which a metal to be granulated is melted. An atmospheric gas, having the chemical composition specifically adjusted in a mixed gas tank 8, is fed through a pipe 9 and a pipe 10, respectively into the granulation chamber 1 and to the top of the electric furnace 7. Inner pressure of the granulation chamber 1 is controlled by a valve 11 and a ventilator 12, and inner pressure of the electric furnace 7 is controlled by a valve 13 and a ventilator 14. The molten metal fed through the nozzle 3 onto the dish-like rotating disk 4 is scattered in the form of fine droplets with the aid of centrifugal force of the dish-like rotating disk 4, and then solidified after cooled under reduced pressure. The thus produced solid particles are fed through the discharge pipe 6 to an automatic filter 15, where the particles are classified. Reference sign 16 represents a particle collector.

A process of bringing the molten metal from the hot molten state down to the cold solidified state is the key for formation of the metal particle of this invention.

The process is carried out under conditions exemplified below.

With the melting temperature of metal in the electric furnace 7 preset to 800° C. to 1000° C., the molten metal kept at that temperature is fed through the nozzle 3 onto the dish-like rotating disk 4.

The dish-like rotating disk 4 is a dish-like disk having an inner diameter of 35 mm and a thickness of rotating plate of 5 mm, which is rotated at 80,000 to 100,000 rpm.

A vacuum chamber which can be evacuated down to around $9\times10^{-2}$ Pa is employed here as the granulation chamber 1, and is evacuated, to which nitrogen gas conditioned at 15 to 50° C. is fed while concurrently ventilating the chamber, so as to adjust the pressure in the granulation chamber 1 to $1\times10^{-1}$ Pa or below.

The metal particle of this invention is obtainable as described above. Particle size of the metal particle of this invention, denoted herein to be approximately 5 μm, preferably falls within the range from 1 μm to 50 μm, for example.

Next, the thus obtained metal particle of this invention is melted in vacuo under high-frequency induction heating, cast into a mold in a nitrogen gas atmosphere under the atmospheric pressure, cooled to solidify, rolled into a sheet, and multiply stacked as necessary to obtain a bulk.

Conditions for the high-frequency induction heating and solidification under cooling are the keys for formation of the electroplating electrode of this invention.

The processes are carried out under conditions exemplified below.

High-frequency induction heating: A crucible suited to high-frequency melting is placed in a vacuum chamber which can be evacuated down to around $9\times10^{-2}$ Pa, the metal particle of this invention is placed in the crucible, the metal particle of this invention is subjected to high-frequency induction heating while keeping the pressure at around the aforementioned degree of vacuum, allowed to melt at a heating temperature of 800° C. to 1000° C., and kept at the temperature for 5 to 15 minutes.

Solidification under cooling: Nitrogen gas conditioned at 15 to 50° C. is then fed into the vacuum chamber so as to adjust the heating temperature to approximately 400° C. or above under the atmospheric pressure, the molten metal is cast into a mold, and cooled at 30° C. or below to solidify.

The electroplating electrode of this invention typically has a chemical composition represented by:

0.7 to 15% by mass of Cu;

0.001 to 1% by mass of Cr;

0.01 to 5% by mass of Ni; and the balance of Sn (possibly contains 0.1% by mass or less of an inevitable impurity).

The chemical composition is same as that of the metal particle of this invention.

The parent phase in the electroplating electrode may have a chemical composition represented by 5% by mass or less of Cu (typically 0.1 to 5% by mass), 1% by mass or less of Ni (typically 0.01 to 1% by mass), 1% by mass or less of Cr (typically 0.01 to 1% by mass), and the balance of Sn.

The chemical composition the parent phase is same as that of the metal particle of this invention.

The intermetallic compound crystal in the electroplating electrode of this invention preferably has a chemical composition represented by:

50 to 70% by mass of Sn;

30 to 50% by mass of Cu;

0.001 to 3% by mass of Cr; and 0.01 to 6.5% by mass of Ni.

The intermetallic compound in the electroplating electrode of this invention typically accounts for 20 to 60% by mass of the whole electroplating electrode, wherein the percentage is more preferably 30 to 40% by mass.

The intermetallic compound crystal resides in the parent phase so as to be included therein.

The chemical compositions and proportions of the parent phase and the intermetallic compound crystal in the electroplating electrode of this invention may be met by following manufacturing conditions of the electroplating electrode. Note that the present inventors have confirmed that the structure of the electroplating electrode of this invention was maintained, even after rolled into a sheet or processed into a bulk.

The electroplating electrode of this invention is preferably such that at least parts of the parent phase and the intermetallic compound form an endotaxial joint. As described previously, the endotaxial joint means that an intermetallic compound precipitates in a substance which is expected to become metal or alloy (the parent phase in this invention), wherein an Sn—Cu alloy and the intermetallic compound join during the precipitation while attaining lattice matching, thereby producing crystal grains. Formation of the endotaxial joint can solve the problem of brittleness of the intermetallic compound, can also suppress the mechanical strength from degrading due to changes in the crystal structure of Sn, making it possible to provide a contact terminal that excels in durability.

The endotaxial joint in the electroplating electrode of this invention may be formed according to the aforementioned conditions for manufacturing the electroplating electrode.

Area percentage of the endotaxial joint, when assuming the total area of joint face between the parent phase and the intermetallic compound as 100%, is preferably 30% or larger, and more preferably 60% or larger. The area percentage of the endotaxial joint may be calculated typically as follows.

A cross section of the metal particle is photographed under an electron microscope, and joint faces between the intermetallic compound and the Sn—Cu alloy are sampled at 50 freely selected points. The joint faces are then examined by image analysis, thereby determining to what degree the endotaxial joint, such as presented later in Examples, resides in the sampled joint faces.

The electroplating electrode of this invention is useful as an anode used for electroplating for forming the plating layer. The electroplating electrode of this invention allows the intermetallic compound crystal contained therein to disperse in a plating bath, while keeping the form of nano-sized (1 μm or smaller) particle having electric charge, and to deposit together with the parent phase on the surface of a base, to form a plating layer. The thus formed plating layer preferably has a structure in which the intermetallic compound crystal that contains Sn, Cu, Cr and Ni, is dispersed in the parent phase formed of the Sn—Cu alloy, and in which at least parts of the parent phase and the intermetallic compound crystal form an endotaxial joint. The formation of an epitaxial joint between the plating layer and the base is also preferred embodiment.

Besides having the electroplating electrode of this invention, the plating bath for forming the plating layer may have a chemical composition below.

| | |
|---|---|
| Copper sulfate | 180 to 250 g/L |
| Tin(II) sulfate | 30 to 50 g/L |
| Sulfuric acid | 80 to 120 g/L |

Additives (adhesion inhibitor, interfacial complexing agent, film forming agent, electric field diffusion-consumption-formation aid)

In addition to the exemplified components, the plating bath may typically contain any of known dispersion aid, brightener, or antioxidant, appropriately added thereto as necessary. The additives are exemplified by dispersion aids such as polyoxyethylene cumyl phenyl ether, and polyoxyethylene lauryl ether; brighteners such as cresol sulfonic acid, acetaldehyde, and acetylacetone; and antioxidants such as formalin, catechol, and hydroquinone.

Plating temperature is typically 30° C. or below, and preferably from 15 to 20° C.

Current density is suitably controlled within the range, for example, from 1 to 10 A/dm$^2$.

The chemical composition of the intermetallic compound crystal contained in the plating layer is same as that of the electroplating electrode of this invention. That is, the chemical composition is typically represented by:

50 to 70% by mass of Sn;

30 to 50% by mass of Cu;

0.001 to 3% by mass of Cr; and 0.01 to 6.5% by mass of Ni.

Content of the intermetallic compound crystal in the plating layer typically accounts for 20 to 60% by mass. Also the chemical composition of the parent phase is same as that of the electroplating electrode of this invention. That is, the chemical composition of the parent phase is represented by 5% by mass or less of Cu, 1% by mass or less of Ni, 1% by mass or less of Cr, and the balance of Sn (possibly contains 0.1% by mass or less of an inevitable impurity).

The chemical compositions and the structures of the plating layer as a whole, the parent phase and the intermetallic compound are obtainable under the conditions of plating with use of the electroplating electrode of this invention. The base after the plating is then subjected to heat treatment. The heat treatment conditions typically involve a temperature of 100 to 300° C. and a heating time of around 5 to 30 seconds.

The plating layer is thus formed on the surface of the base by the aforementioned operations. The plating layer is typically 2 μm to 10 μm thick.

The base is made of any of known materials selectable without special limitation, which are exemplified by aluminum, aluminum alloy, copper, copper alloy, and stainless steel. The copper alloy is exemplified by brass and phosphor bronze.

In a case where the terminal of this invention is used as a micro-bump, the base is preferably made of Si, SiC or GaN.

In another embodiment, this invention is to provide a bump. The bump of this invention has a chemical composition same as that of the terminal of this invention. That is, the bump of this invention has a plating layer formed on a surface of the base, and the plating layer has a structure in which the intermetallic compound crystal that contains Sn, Cu, Cr and Ni, is dispersed in the parent phase that contains Sn and an Sn—Cu alloy. Details of the plating layer of the bump of this invention are same as those of the plating layer of the terminal of this invention, and will not be detailed again.

The bump may further have a layer of titanium, nickel, or nickel alloy formed under the plating layer, so as to further enhance the heat resistance. The nickel alloy usable herein may contain one or two elements selected from iron, tin, zinc, copper, cobalt, phosphorus, silver, and boron. The underlying layer preferably has a thickness of around 0.1 μm to 1.5 μm for example.

EXAMPLE

This invention will further be explained below referring to Examples and Comparative Examples. This invention is, however, not limited to Examples below.

Example 1

Figure 4:
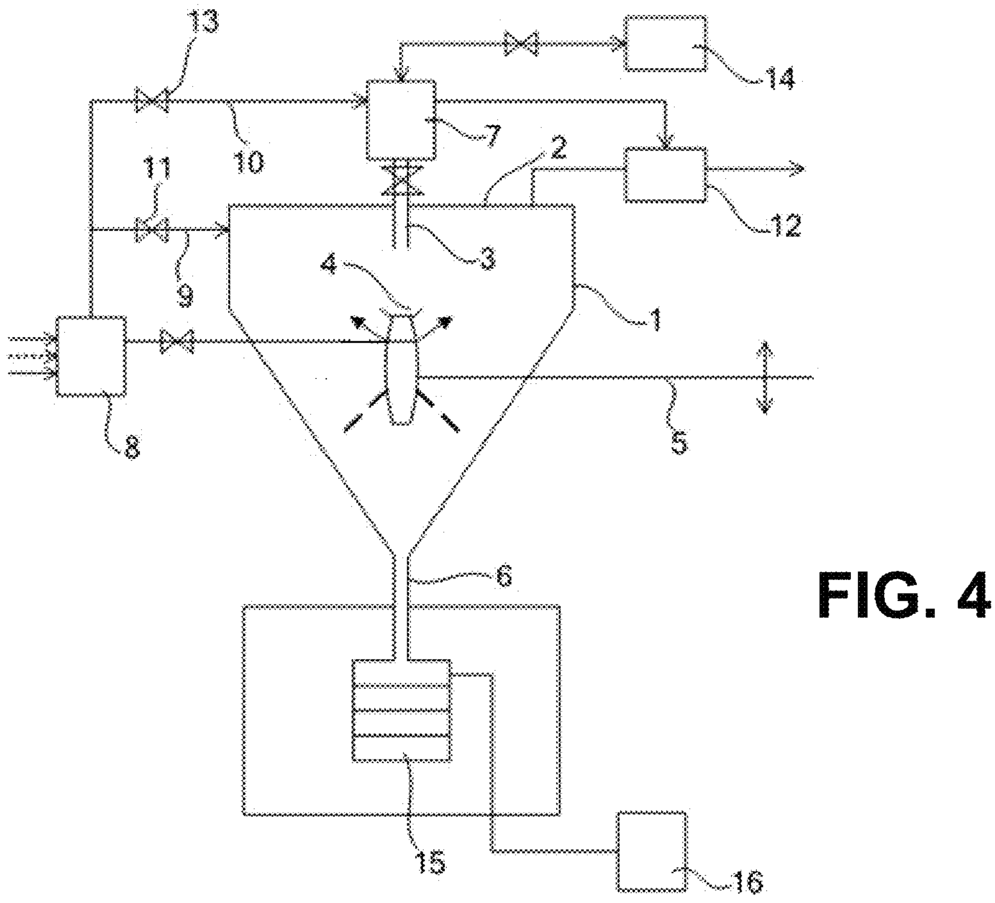
FIG. 4 is a diagram of an exemplary manufacturing apparatus suitable for producing a metal particle of this invention.

A metal particle having a diameter of approximately 3 to 50 μm was manufactured from a raw material composed of 8% by mass of Cu, 1% by mass of Cr, 1% by mass of Ni, and the balance of Sn, with use of the manufacturing apparatus illustrated in FIG. 4.

Conditions employed herein were as follows.

A melting crucible was placed in the electric furnace 7, the aforementioned raw material was placed therein and melted at 900° C., and while keeping the temperature, the molten metal was fed through the nozzle 3 onto the dish-like rotating disk 4.

The dish-like rotating disk 4 employed here was a dish-like disk with an inner diameter of 35 mm and a thickness of rotating plate of 3 to 5 mm, which was rotated at 80,000 to 100,000 rpm.

The granulation chamber 1 which can be evacuated down to around $9\times10^{-2}$ Pa was evacuated, to which nitrogen gas at 15 to 50° C. was fed and concurrently evacuated, thereby adjusting the inner pressure of the granulation chamber 1 to $1\times10^{-1}$ Pa or below.

The thus obtained metal particle was then used to manufacture the electroplating electrode of this invention.

Conditions employed herein were as follows.

High-frequency induction heating: A crucible suited to high-frequency melting was placed in a vacuum chamber which can be evacuated down to around $9\times10^{-2}$ Pa, the metal particle of this invention was placed in the crucible, the metal particle of this invention was subjected to high-frequency induction heating while keeping the pressure at around the aforementioned degree of vacuum, allowed to melt at a heating temperature of 900° C., and kept at the temperature for 5 minutes.

Solidification under cooling: Nitrogen gas conditioned at 15 to 50° C. was then fed into the vacuum chamber for 10 minutes so as to adjust the heating temperature under the atmospheric pressure to approximately 400° C., the molten metal was cast into a mold, and cooled at room temperature to solidify.

The obtained material was then rolled into a sheet, fed to a cutting machine heated at 150° C., and cut into 1 cm to 3 cm square to obtain an electroplating electrode of Example 1. The electrode was set in a plating bath described below.

Figure 2:
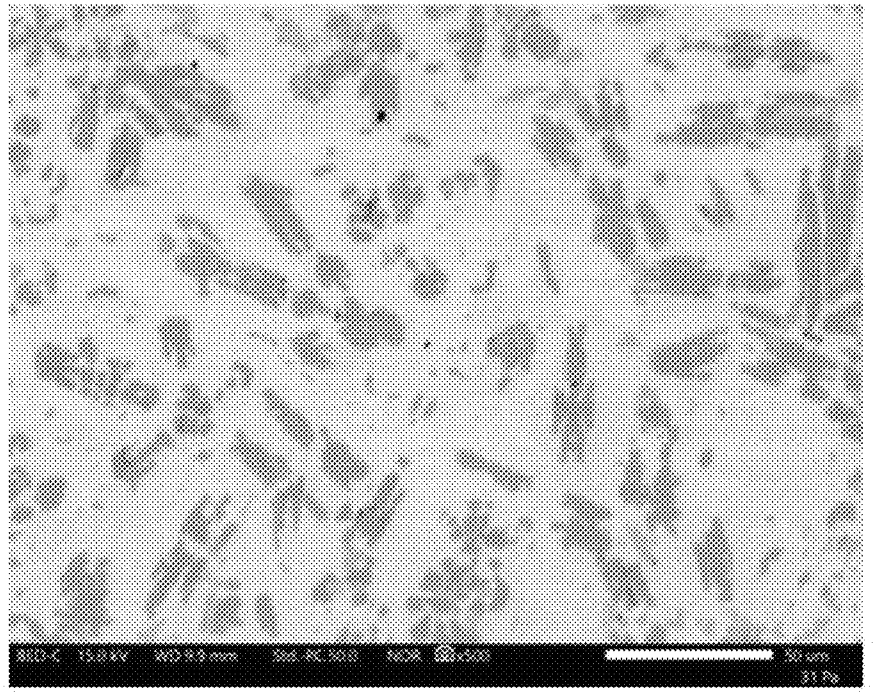
FIG. 2 is a cross-sectional SEM image of the electroplating electrode obtained in Example 1.

The thus obtained electroplating electrode of Example 1 was found to have a cross section illustrated in FIG. 1. FIG. 2 is a cross-sectional SEM image of the electroplating electrode obtained in Example 1, from which the intermetallic compound crystal (looks dark) was confirmed to reside in the parent phase (looks bright) so as to be included therein.

Figure 3A:
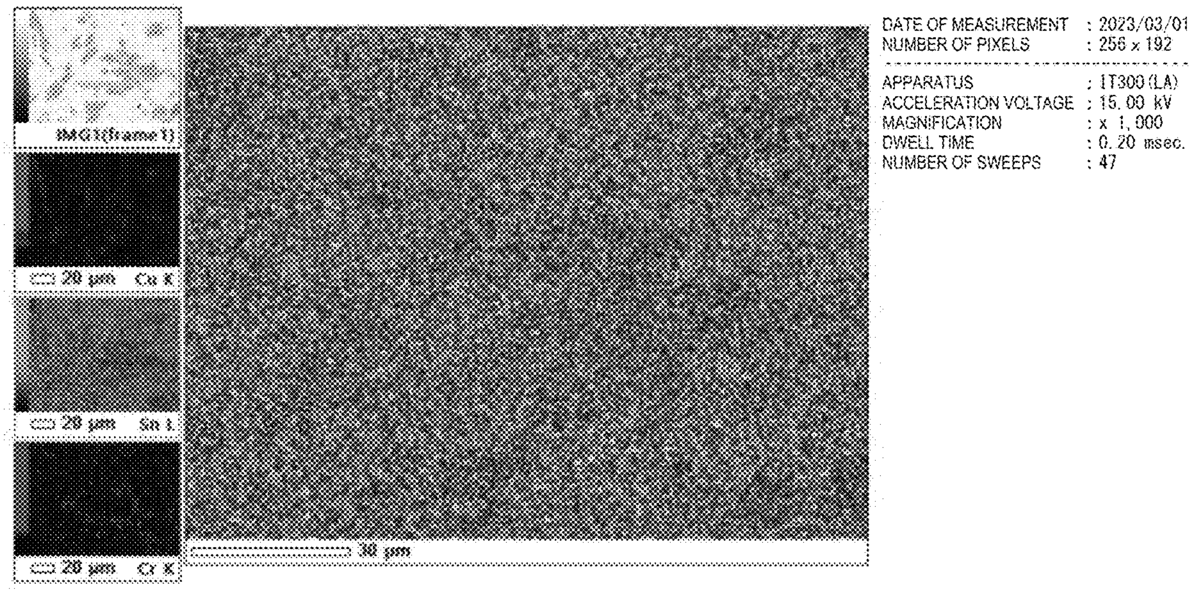
FIGS. 3A and 3B are charts illustrating results of EDS elemental mapping of the electroplating electrode obtained in Example 1.
Figure 3B:
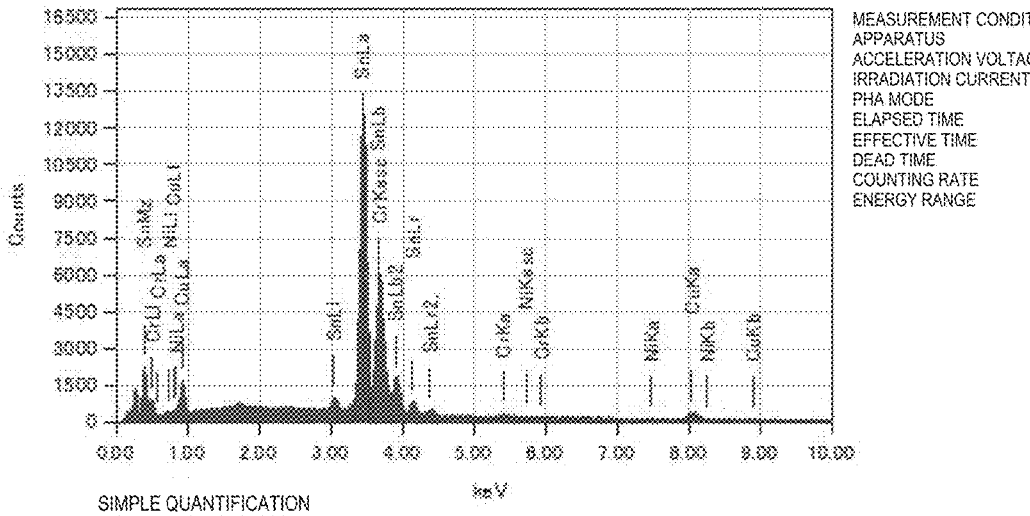

EDS elemental mapping on a cross section of the electroplating electrode (see FIGS. 3A-3B) revealed that the chemical composition was represented by 8% by mass of Cu, 1% by mass of Cr, 1% by mass of Ni, and the balance of Sn.

The electroplating electrode of Example 1 was also found to have the intermetallic compound crystal so as to be included in the parent phase, and at least parts of the parent phase and the intermetallic compound crystal form the endotaxial joint.

A part that contains the intermetallic compound crystal and the endotaxial joint was found to have a chemical composition represented by:

50 to 70% by mass of Sn;
30 to 50% by mass of Cu;
0.001 to 3% by mass of Cr; and
0.01 to 6.5% by mass of Ni.

The intermetallic compound crystal in the electroplating electrode was found to account for 30 to 35% by mass.

(Preparation of Contact Terminal)

A phosphor bronze or brass sheet (0.30 mm thick) was used as a base (cathode).

The base was then subjected to electroplating under conditions below, with use of the electroplating electrode of this invention as an electroplating electrode, to obtain a plated sheet.

Chemical Composition of Plating Bath (Concentrations Per One Liter of Water):

Copper sulfate 180 to 250 g/L
Tin(II) sulfate 30 to 50 g/L
Sulfuric acid 80 to 120 g/L A known reference electrode was employed, and an appropriate amount of an additive was added.

Plating temperature: 70° C.
Current density: 3 A/dm$^2$
Heating temperature of base after plating: 200° C.
Heating time of base after plating: 300 seconds (in nitrogen atmosphere)

The plating layer of the thus obtained contact terminal was found to have a chemical composition same as that of the electroplating electrode of this invention.

Durability of the contact terminal thus obtained in Example 1 was examined by an experiment below.

<Method for Measuring Durability>

(U-Bend Test)

Figure 5A:
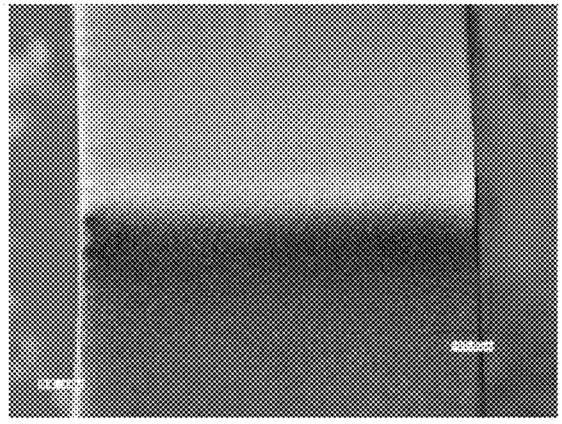
FIGS. 5A and 5B are microphotographs illustrating results of a U-bend test of a contact terminal obtained in Example 1.
Figure 5B:
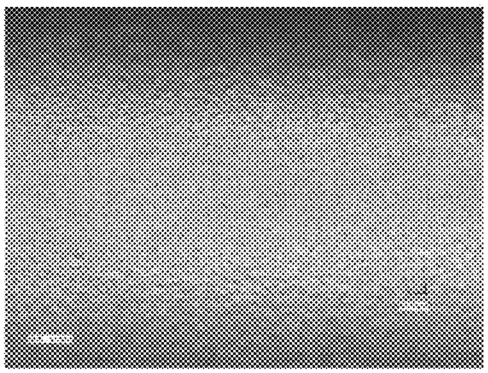

The contact terminal, whose base was made of a brass sheet, was subjected to U-bend test to observe occurrence of crack. The plating layer was 5 μm thick. FIGS. 5A and 5B are microphotographs illustrating a result of the U-bend test of the contact terminal obtained in Example 1 (wherein FIG. 5A illustrates a whole photo of the contact terminal, and FIG. 5B illustrates an enlarged photo of the bent part). The result taught that crack was not observed in the plating layer of the contact terminal of Example 1.

(Surface Crack Test)

The surface crack test was conducted by punching the thus obtained contact terminal from the back face. FIG. 6 is a microphotograph illustrating a result of the surface crack test of the contact terminal obtained in Example 1. The result taught that surface crack due to punching was not observed in the plating layer of the contact terminal of Example 1.

(Heat Resistance Test)

The thus obtained contact terminal was allowed to stand still at 250° C. for 500 hours, and the surface of the plating layer was observed under a microscope. FIG. 7 contains microphotographs illustrating a result of the heat resistance test of the contact terminal obtained in Example 1. The plating layer of the contact terminal of Example 1 demonstrated no change between before and after the heat resistance test.

Comparative Example 1

A contact terminal was manufactured in the same way as in Example 1, except that the electroplating electrode was changed to a tin metal, and then subjected to the U-bed test, surface crack test, and heat resistance test.

Figure 8A:
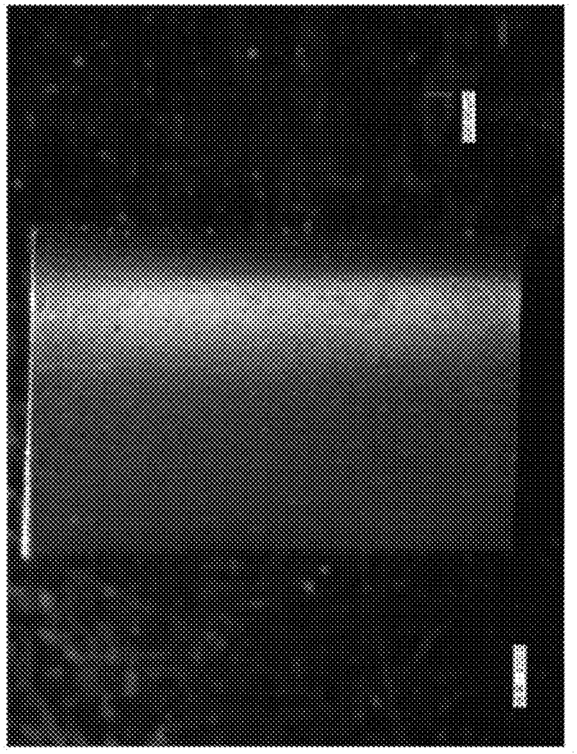
FIGS. 8A and 8B are microphotographs illustrating a result of the U-bend test of a contact terminal obtained in Comparative Example 1.
Figure 8B:
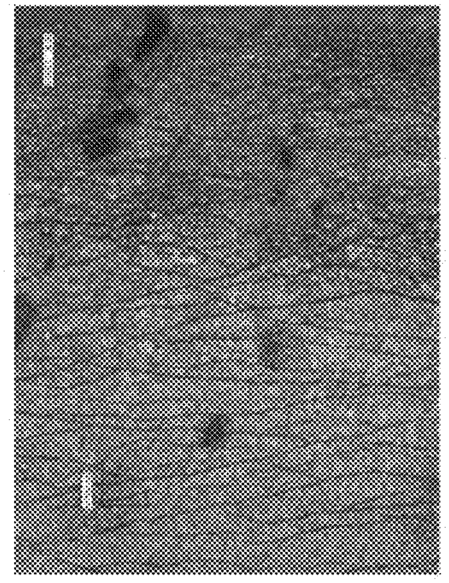

FIGS. 8A and 8B are microphotographs illustrating a result of the U-bend test of the contact terminal obtained in Comparative Example 1. The result taught that the plating layer after the U-bend test caused cracks and separation between the plating layer and the base.

Figure 9:
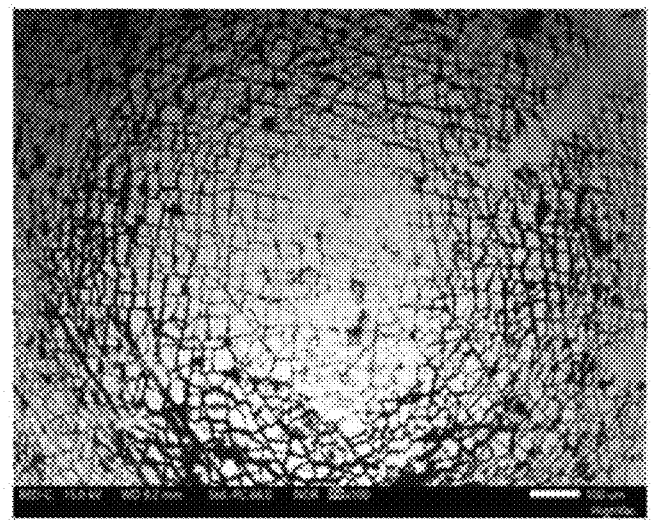
FIG. 9 is a microphotograph illustrating a result of the surface crack test of a contact terminal obtained in Comparative Example 1.

FIG. 9 is a microphotograph illustrating a result of the surface crack test of the contact terminal obtained in Comparative Example 1. The result taught that surface crack caused by punching was observed in the plating layer of the contact terminal of Comparative Example 1.

Figure 10:
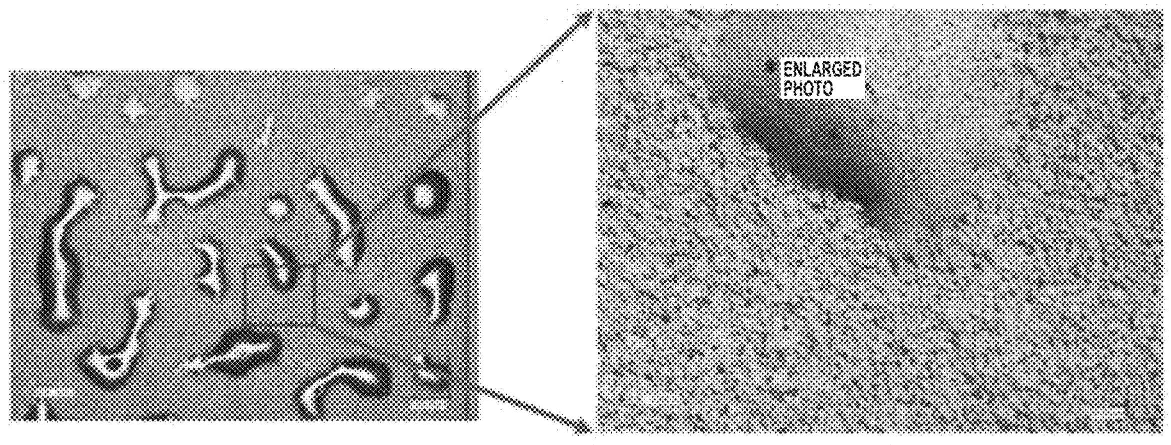
FIG. 10 contains microphotographs illustrating a result of the heat resistance test of the contact terminal obtained in Comparative Example 1.

FIG. 10 contains microphotographs illustrating a result of heat resistance test of the contact terminal obtained in Comparative Example 1.

The result taught that the plating layer of the contact terminal of Comparative Example 1 partially melted under heating conditions that involves standing still at 250° C. for 500 hours.

Having detailed this invention referring to the attached drawings, this invention is not limited to these Examples. It is apparent that those skilled in the art will easily arrive at various modifications, on the basis of basic technical spirit and teaching of this invention.

REFERENCE SIGNS LIST

1 granulation chamber
2 lid
3 nozzle
4 dish-like rotating disk
5 rotating disk support mechanism
6 particle discharge pipe
7 electric furnace
8 mixed gas tank
9 pipe
10 pipe
11 valve
12 ventilator
13 valve
14 ventilator
15 automatic filter
16 particle collector

What is claimed is:

1. A terminal having a plating layer formed on a surface of a base,
- the plating layer having a structure in which an intermetallic compound crystal that contains Sn, Cu, Cr and Ni, is dispersed in a parent phase that contains Sn and an Sn—Cu alloy,
- wherein the intermetallic compound crystal has a chemical composition represented by:
- 50 to 70% by mass of Sn;
- 30 to 50% by mass of Cu;
- 0.001 to 3% by mass of Cr; and
- 0.01 to 6.5% by mass of Ni.

2. The terminal according to claim 1, wherein the plating layer has a chemical composition represented by:
- 0.7 to 15% by mass of Cu;
- 0.001 to 1% by mass of Cr;
- 0.01 to 5% by mass of Ni;
- 0.1% by mass or less of an inevitable impurity and the balance of Sn,
- and the parent phase has a chemical composition represented by 5% by mass or less of Cu, 1% by mass or less of Ni, 1% by mass or less of Cr, 0.1% by mass or less of an inevitable impurity and the balance of Sn.

3. The terminal according to claim 1, further comprising a layer of titanium, nickel or nickel alloy formed under the plating layer.

4. The terminal according to claim 1, wherein the base comprises aluminum, aluminum alloy, copper, copper alloy or stainless steel.

5. The terminal according to claim 1, wherein the base comprises Si, SiC or GaN.

6. A bump having a plating layer formed on a surface of a base,
- the plating layer having a structure in which an intermetallic compound crystal that contains Sn, Cu, Cr and Ni, is dispersed in a parent phase that contains Sn and an Sn—Cu alloy,
- wherein the intermetallic compound crystal has a chemical composition represented by:
- 50 to 70% by mass of Sn:
- 30 to 50% by mass of Cu;
- 0.001 to 3% by mass of Cr; and
- 0.01 to 6.5% by mass of Ni.

* * * * *